US007916761B2

(12) United States Patent
Guichard et al.

(10) Patent No.: US 7,916,761 B2
(45) Date of Patent: Mar. 29, 2011

(54) METHODS AND APPARATUS FOR ADDING LATENCY AND JITTER TO SELECTED NETWORK PACKETS

(75) Inventors: David J. Guichard, Seattle, WA (US); Yong-Long Calvin Ling, Bellevue, WA (US); Michael John McNicholl, Renton, WA (US); George K. Wu, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 102 days.

(21) Appl. No.: 12/263,586

(22) Filed: Nov. 3, 2008

(65) Prior Publication Data
US 2010/0110908 A1 May 6, 2010

(51) Int. Cl.
*H04J 3/06* (2006.01)
(52) U.S. Cl. ...................................................... 370/516
(58) Field of Classification Search ........... 370/516–517
See application file for complete search history.

(56) References Cited

U.S. PATENT DOCUMENTS

| 5,933,414 | A | * | 8/1999 | Georgiadis et al. | 370/238 |
| 6,038,230 | A | * | 3/2000 | Ofek | 370/389 |
| 6,314,531 | B1 | | 11/2001 | Kram | |
| 7,590,061 | B2 | * | 9/2009 | Barry et al. | 370/230 |
| 2002/0039371 | A1 | * | 4/2002 | Hedayat et al. | 370/516 |
| 2004/0066781 | A1 | * | 4/2004 | Shankar et al. | 370/389 |
| 2004/0088605 | A1 | * | 5/2004 | Nakamoto et al. | 714/43 |
| 2004/0233931 | A1 | * | 11/2004 | Cohen | 370/468 |
| 2006/0034338 | A1 | * | 2/2006 | Degenhardt et al. | 370/516 |
| 2007/0064715 | A1 | * | 3/2007 | Lloyd et al. | 370/401 |
| 2007/0253337 | A1 | * | 11/2007 | Morinaga et al. | 370/249 |
| 2007/0280247 | A1 | * | 12/2007 | Mera et al. | 370/392 |

OTHER PUBLICATIONS

Philippa Conmy, John McDermid, Department of Computer Science, University of York, 2001, High Level Failure Analysis for Integrated Modular Avionics.*

* cited by examiner

*Primary Examiner* — Kwang B Yao
*Assistant Examiner* — Juvena Loo
(74) *Attorney, Agent, or Firm* — Armstrong Teasdale LLP

(57) ABSTRACT

A method for adding latency and jitter to a number of selected packets transmitted between end systems within a network of end systems is described. The method includes receiving a packet identifier, the packet identifier indicating a selected packet to which latency and jitter is to be added, receiving a selected latency and jitter for the selected packet, receiving a packet, determining if the received packet is the selected packet, and forwarding the received packet to its destination if the received packet is not the selected packet. If the received packet is the selected packet, the method continues by reading a real time clock, computing a transmit time for the received packet based on the selected latency and jitter for the selected packet, and forwarding the received packet to its destination when the real time clock reaches the computed transmit time.

20 Claims, 5 Drawing Sheets

METHODS AND APPARATUS FOR ADDING LATENCY AND JITTER TO SELECTED NETWORK PACKETS

BACKGROUND

The field of the disclosure relates generally to fault testing of real-time computer networks, and more specifically, to methods and apparatus for adding latency and jitter to selected network packets.

When fault testing real-time computer networks, for example, an avionics network to be deployed within an aircraft, insertion of faults at an individual packet address level into such networks is difficult. Certain network testing includes insertion of extra latency and timing jitter into a computer network to test the sensitivity of the devices on the network. More specifically, it is desirable to determine the impact on network operations when worst-case network conditions are encountered. In the aircraft context, computer network testing is utilized to test the sensitivity of avionics equipment to worst-case network conditions that might be encountered during a various phases of a flight.

However, and as mentioned above, insertion of faults into a network is difficult as preferred testing methodologies dictate that network faults such as timing delay and jitter, should be inserted in real-time, and only to certain selected network packets. Since a network may transport many different classes of traffic, this fault insertion should also occur without disturbing all other network traffic. In one relevant example, 99% of the network traffic must be passed without disturbance through the network, with faults inserted to only a small percentage of the network traffic. Such network testing naturally requires precise timing of software functions related to insertion and removal of faults.

BRIEF SUMMARY

In one aspect, a method for adding latency and jitter to a number of selected packets transmitted between end systems within a network of end systems is provided. The method includes receiving a packet identifier, the packet identifier indicating a selected packet to which latency and jitter is to be added, receiving a selected latency and jitter for the selected packet, receiving a packet, determining if the received packet is the selected packet, and forwarding the received packet to its destination if the received packet is not the selected packet. If the received packet is the selected packet, the method further includes reading a real time clock, computing a transmit time for the received packet based on the selected latency and jitter for the selected packet, and storing the received packet for later forwarding to its destination when the real time clock reaches the computed transmit time.

In another aspect, a network testing system is provided. The system includes a computer including a user interface and a real time clock, and a network interface communicatively coupled to the computer. The computer and user interface are operable to select a packet transmitted within a network to be tested for the addition of latency and jitter based on an identifier within the packet and further operable to select a latency and jitter to be applied to the selected packet. The network interface includes a first interface configured for communicative coupling to a first network end system and a second interface configured for communicative coupling to a second network end system. The network interface is operable to receive a packet at the first interface, determine if the received packet is the selected packet, forward the received packet to its destination via the second interface if the received packet is not the selected packet. If the received packet is the selected packet, the network interface is operable to read the real time clock, compute a transmit time for the received packet based on the selected latency and jitter, and store the received packet for later forwarding to its destination via the second interface when the real time clock reaches the computed transmit time.

In still another aspect, a network interface includes a first interface configured for communicative coupling to a first network end system, and a second interface configured for communicative coupling to a second network end system. The network interface is operable to receive a packet at the first interface, determine if an identifier associated with the received packet matches a selected packet identifier, and forward the received packet to its destination via the second interface if the received packet identifier does not match the selected packet identifier. If the received packet identifier does match the selected packet identifier, the network interface is further operable to read a real time clock, compute a transmit time for the received packet based on a received latency and jitter, and store the received packet for later forwarding to its destination via the second interface when the real time clock reaches the computed transmit time.

The features, functions, and advantages that have been discussed can be achieved independently in various embodiments of the present invention or may be combined in yet other embodiments further details of which can be seen with reference to the following description and drawings.

DETAILED DESCRIPTION

In various embodiments, a tool that includes a computer application and network interface is described herein. To provide network testing capabilities, the network interface, which in one embodiment is a printed circuit card, is inserted into a network and operable to add extra latency and timing jitter only to certain network packets. The packets to which latency and jitter are selected by the test operator, and the method and apparatus operate without disturbing normal network traffic. In one practical example, the tool inserts extra latency and timing jitter into an airplane network to test the sensitivity of avionics equipment to worst-case network conditions that might be encountered during various phases of a flight.

Figure 1:
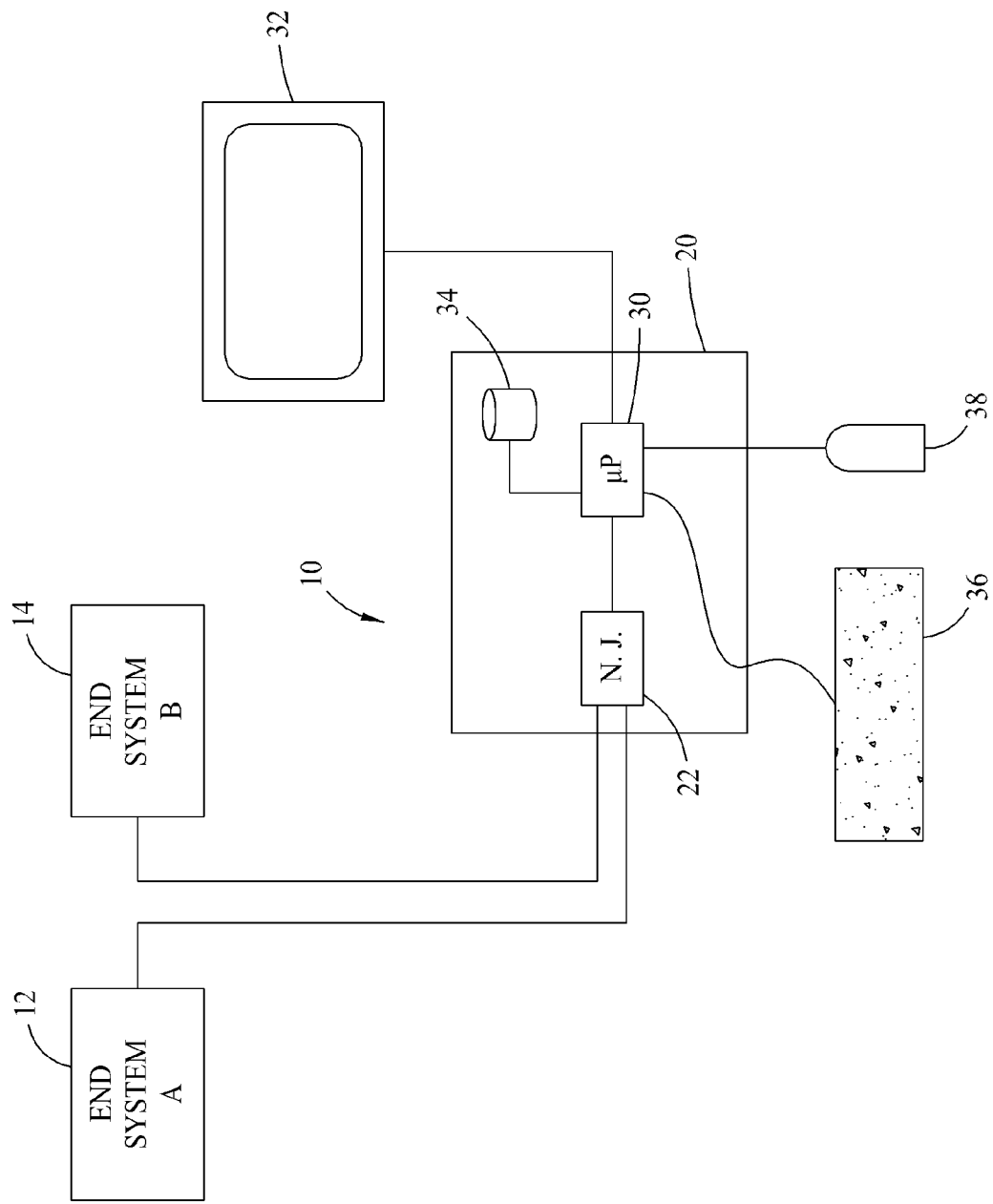
FIG. 1 is a block diagram illustrating a network testing tool located between two network end systems.

FIG. 1 is a block diagram that illustrates a network testing tool 10 that is located between two network end systems, end system A 12 and end system B 14 respectively. When network testing operations are not being performed, end system A 12 and end system B 14 are directly coupled to one another and communicate with one another.

In the illustrated embodiment, the network testing tool, or system, 10 includes a computer 20 hosting a two-channel network interface card (or two separate network interfaces)

22. In the embodiment computer 20 is a type of personal computer, and includes, for example a microprocessor 30 which is operatively coupled to a display 32, a memory 34 such as a hard drive, a keyboard 36 and a mouse 38. The network interface card 22 is inserted into the network data stream between the two end systems 12 and 14. A software application, which may be stored in memory 34 is operable to be run via a user interface (such as display 32, keyboard 36, and mouse 38) associated with the computer 20. In one specific embodiment, the software application is started by a test operator via the user interface (e.g., double-clicking on an icon on the display 32 utilizing a pointer function associated with the mouse 38). In the embodiment, upon initiation of the software application, a graphical user interface (described further below) is displayed on the display 32, along with help instructions.

Figure 2:
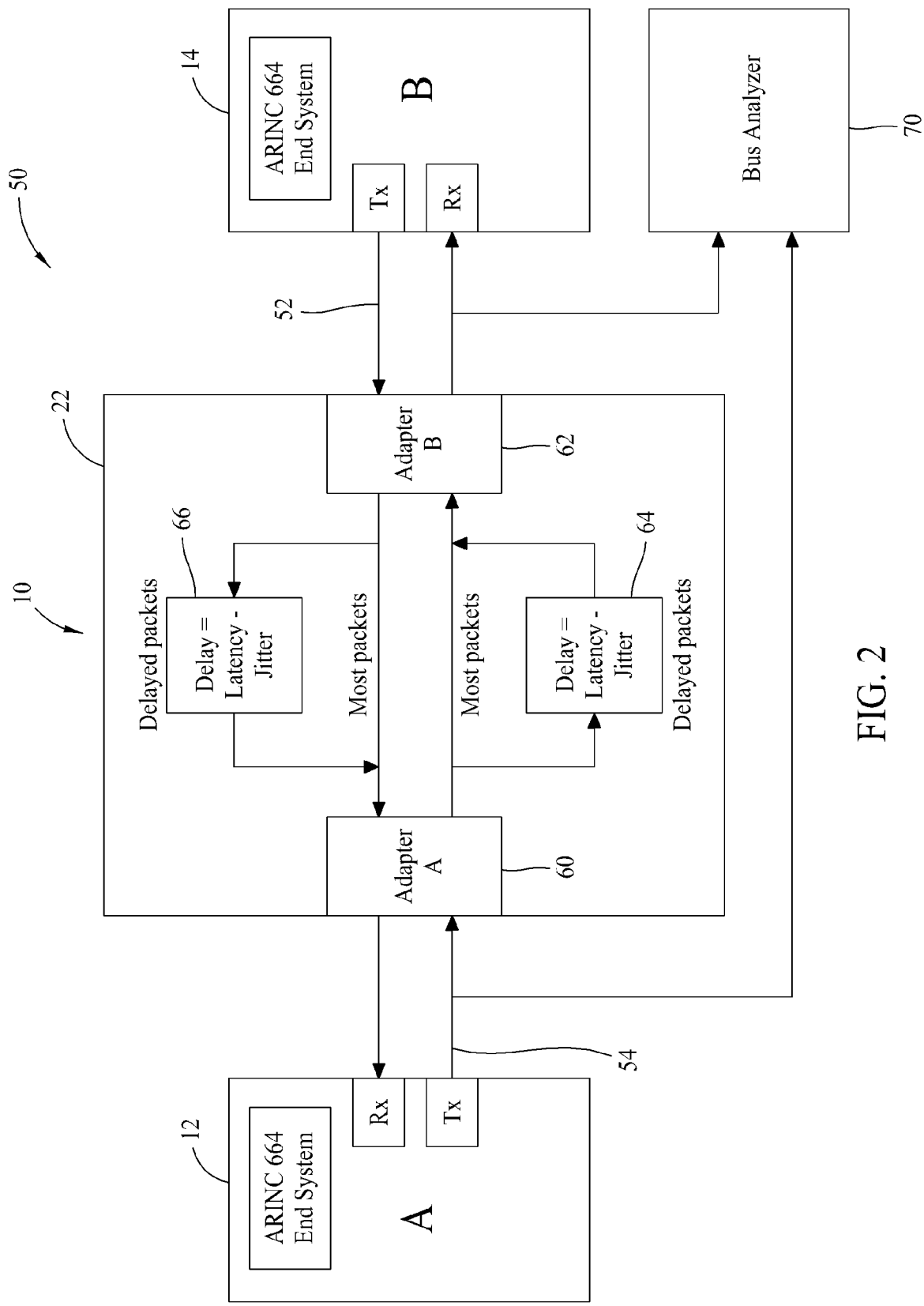
FIG. 2 is a functional block diagram illustrating operation of the network testing tool of FIG. 1.

FIG. 2 is a functional block diagram 50 that illustrates operation of the network testing tool 10 when it is placed between the two network end systems 12 and 14. As described above, the network interface card 22 is operationally inserted into the network data streams 52 and 54 between the two end systems 12 and 14.

To insert faults into the computer network, via the graphical user interface, the test operator enters one or more of the following into the graphical user interface, for example, a packet identifier, a destination port, a latency in milliseconds, and a percent jitter. Upon insertion of the faults via the user interface, all incoming network packets in the data stream are read by the network interface card 22.

Within the network interface card 22, the destination address of a packet sent from end system A 12 to end system B 14 is compared at adapter A 60 with the packet identifiers entered by the operator. If a match is not detected, the packet is forwarded immediately to adapter B 62 and on to its destination, in the illustrated example the destination being end system B 14. If a match is detected, the latency and jitter parameters input by the operator can be used to compute when this packet should be transmitted though adapter B 62 and on to the destination (end system B 14). The packet is then stored for later transmission. It should be noted that network interface card 22 is configured for adding latency and jitter for messages that originate at end system B 14 and are destined for end system A 12 and the tendency herein to describe messages as being routed from end system A 12 to end system B 14 is just one example of message traffic between these end systems.

The packet and a transmit time of the packet are stored temporarily in a circular buffer which is represented by delayed packets 64 messages going from A to B) and 66 (messages going from B to A). A clock associated with the computer 20 is read by the network interface card 22 and compared with a transmit time stamp associated with the next outgoing message packet. If the current time is greater than the transmit time stamp, then the packet is forwarded using adapter B 62, if not the next incoming packet from adapter A 60 is read. The process for forwarding and delaying packets in the direction B-to-A is the same as for direction A-to-B with one embodiment of the software application running on computer 20 checking for new incoming packets on adapters A 60 and B 62 in a continuous loop. In one optional test set up, a bus analyzer may be used to monitor message traffic and to verify the correct latency and jitter have been added.

As further described herein, multiple embodiments of the above described tool 10 exist. Specifically, and with respect to aircraft data networks, the embodiments are transparent, for example, a maximum of eight messages selected for delay or up to four messages in either direction. Such embodiments are sometimes described as being full duplex.

In one specific embodiment, delay includes a fixed latency, minus a random (or worst-case) jitter. The packet ID, latency, and percent jitter are entered by the test operator on a graphical user interface on computer 20 which can be operated with minimal operator training. In one embodiment, parameters for the packets can be modified on the fly, at any time during test operation. The described embodiments provide a uniform test process and tool that hosted function suppliers can use to meet their test requirements, at low cost. As described in the following paragraphs, the user interface is intuitive and simple to operate.

Figure 3:
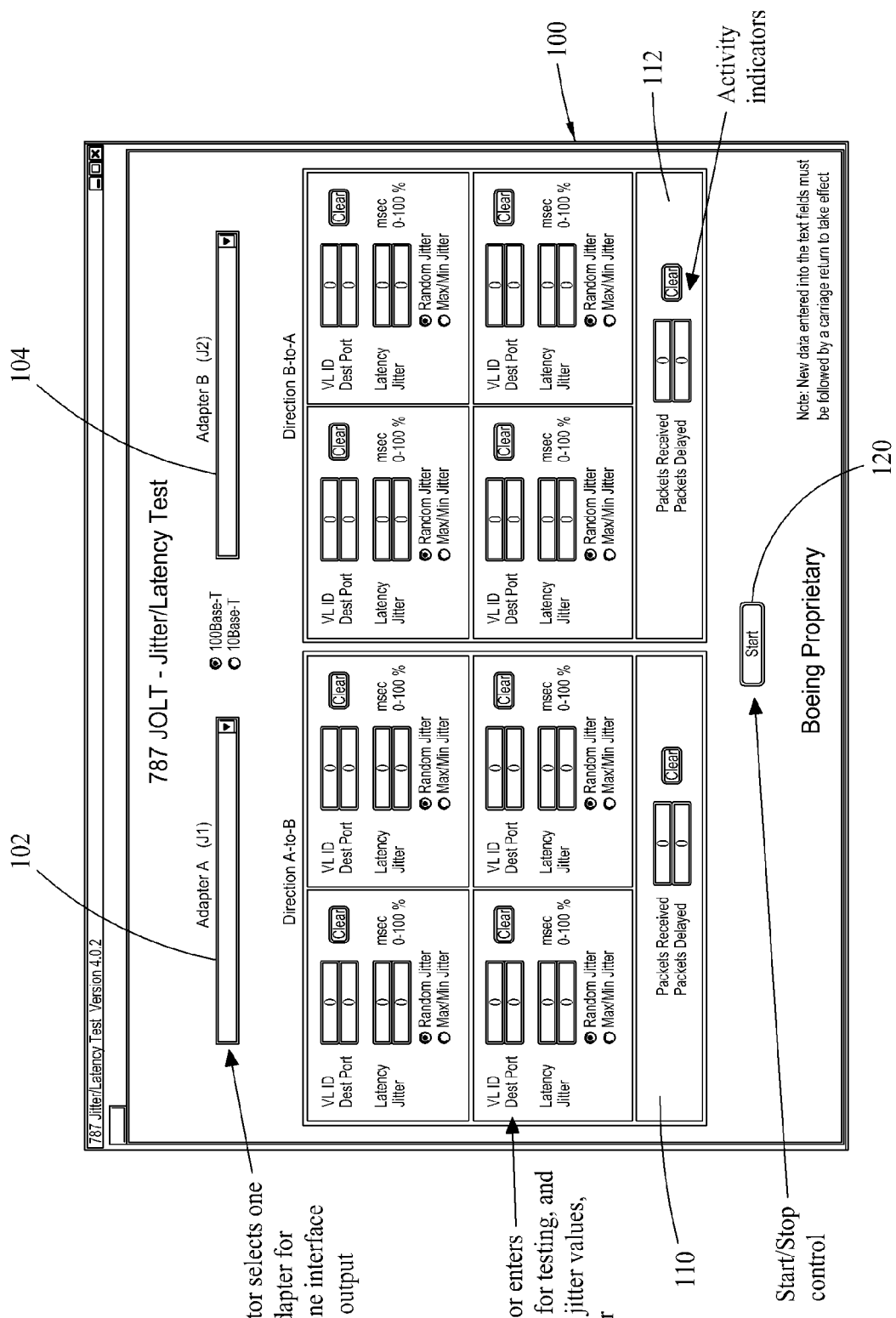
FIG. 3 is one embodiment of a graphical user interface through which an operator can control operation of the network testing tool of FIG. 1.

FIG. 3 is one embodiment of a graphical user interface 100 through which an operator can control operation of the above described network testing tool 10. The operator selects, for example, one of the interface adapters 102 and 104, as shown in FIG. 3, depending on the direction of the traffic the operator wants to test. Specifically, the operator selects one interface adapter for input and the other for output.

The operator then enters a VLID, a destination port, latency and jitter values, and a jitter type into the user interface 100. In the embodiment of graphical user interface 100, these values may be entered for up to eight different messages. Activity indicators 110 and 112 indicate the number of packets received and delayed for each message direction. A start/stop button 120 starts and stops the jitter and latency tests described herein.

Figure 4:
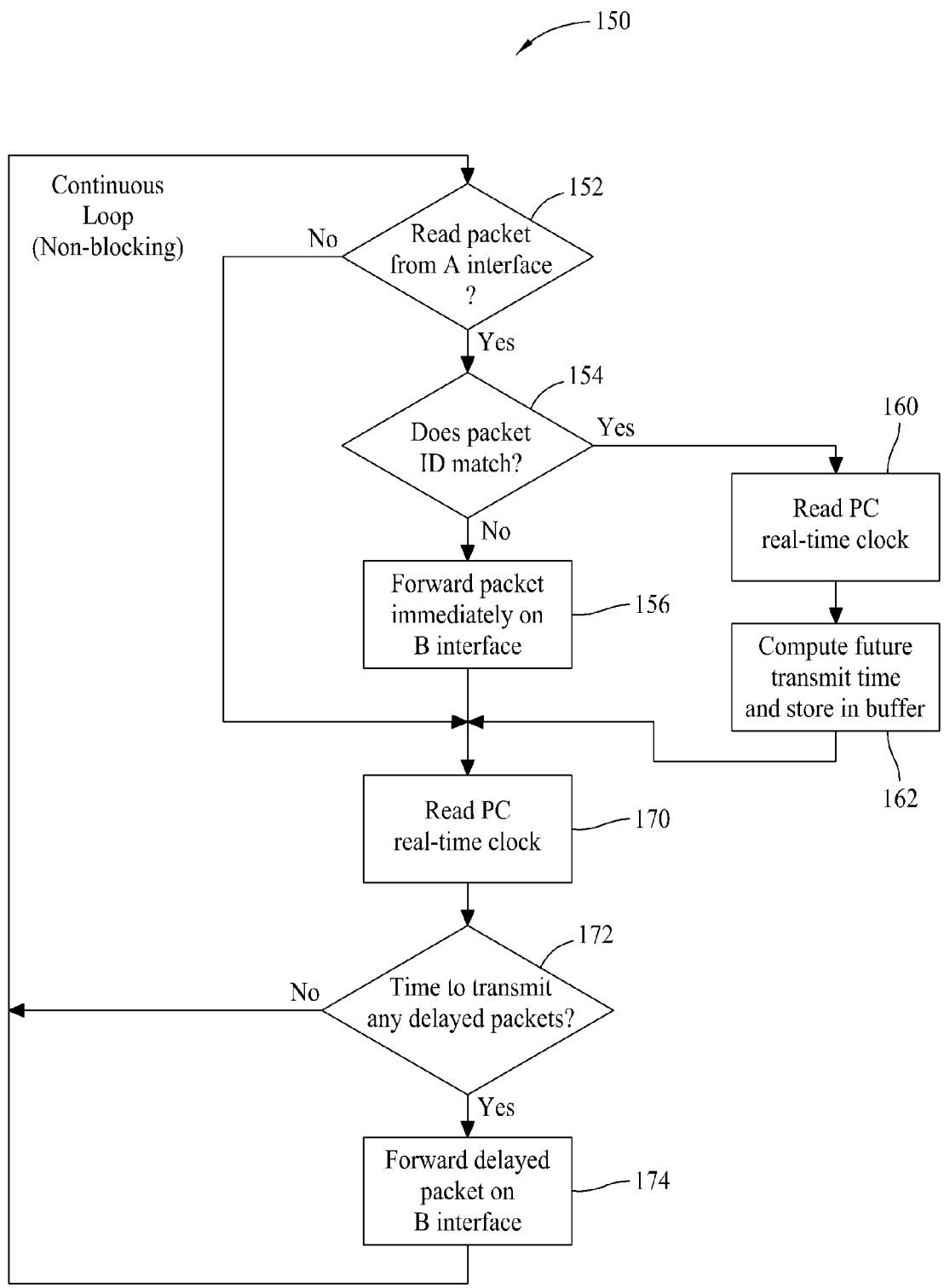
FIG. 4 is a flowchart illustrating a process performed by the network testing tool of FIG. 1.

A flowchart 150 of one-half of a process 160 executed by the above described tool 10 is shown in FIG. 4. The process 160 operates in a loop in a non-blocking mode, in one embodiment. The process 160 does not waits for an event, but rather is continuously polling for incoming messages, reading the PC clock, and checking for outgoing messages with expired delays ready for transmission. The flowchart 150 illustrates the processing of messages in the A-to-B direction. It should be noted that operation in the A-to-B direction and in the B-to-A direction are identical with respect to the method illustrated by the flowchart 150.

Now referring specifically to flowchart 150, should a packet be read 152 at adapter A, the tool 10 (shown in FIG. 1) determines 154 whether the packet identifier (ID) matches a packet ID entered by a user into the graphical user interface 100. If there is not a match, the packet is immediately forwarded 156 to adapter B. When there is a match, a real-time clock of the PC 20 (shown in FIG. 1) is read 160 and a future transmit time is computed 162 and stored with the selected packet in a buffer.

Continuing, the PC real time clock is once again read 170, and if the computed 162 transmit time of a delayed packet matches or is less than 172 the real time clock, the delayed packet is forwarded 174 to adapter B. When the future transmit time exceeds 172 the real time clock, the process starts again by reading the next input packet 152.

As described elsewhere herein, to simulate faults the tool 10 is operable to add excess latency and jitter to selected network packets in the range of 1-1000 milliseconds. However, if a packet is not selected for delay, the packet is forwarded immediately, with a nominal delay that is negligible to the two systems communicating. In one embodiment, the delays experienced are about 50 microseconds.

Figure 5:
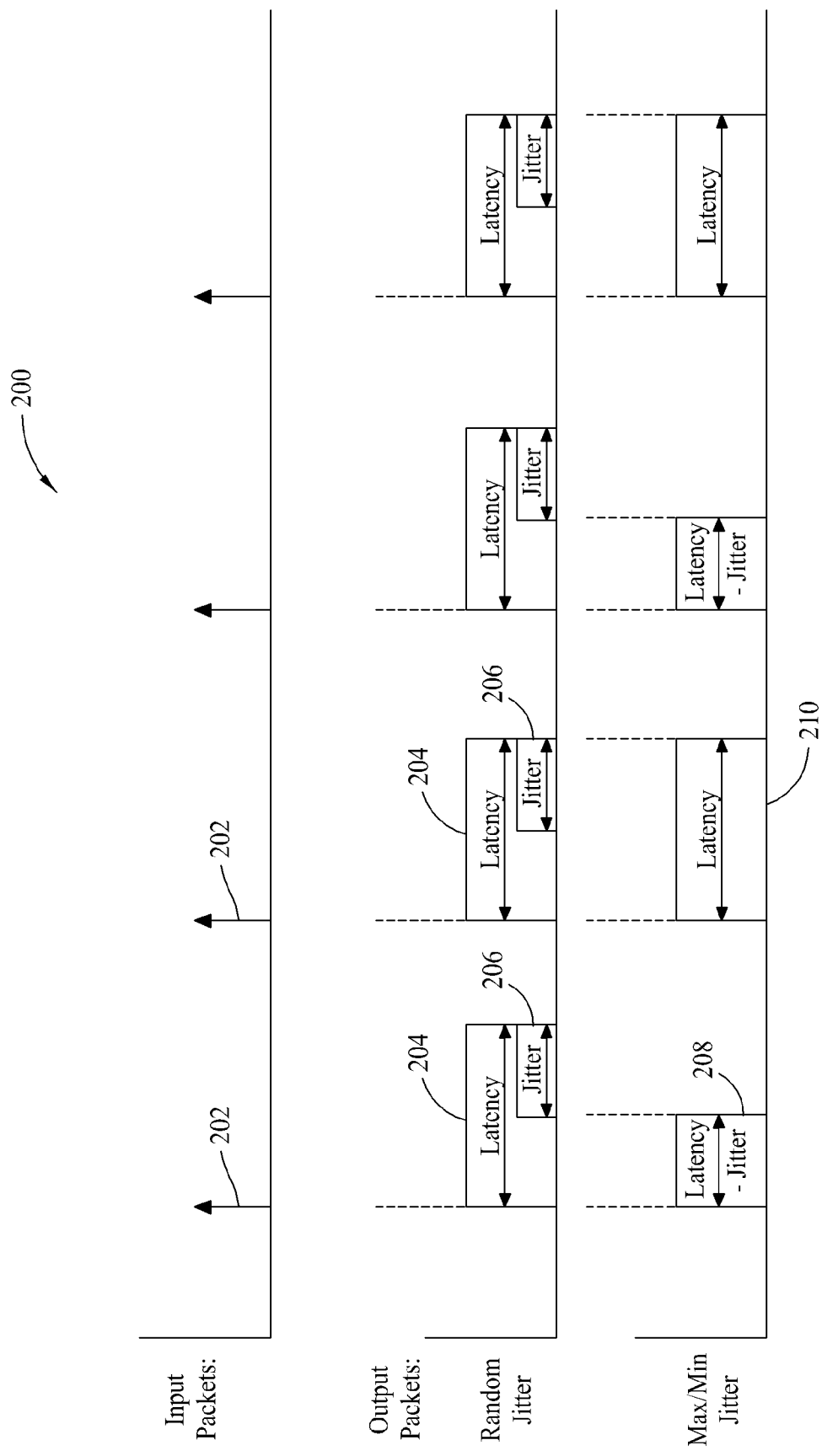
FIG. 5 is a graphical illustration of latency and jitter with respect to an input packet.

In one embodiment of tool 10, latency is a fixed delay, for example, of between one and one thousand milliseconds, that is entered by the test operator. Jitter is a percentage of the latency, for example from zero to one hundred percent, which is subtracted from the latency. Jitter can be applied to the latency using a random function, or alternating between the maximum and minimum values. FIG. 5 is a graphical representation 200 of latency and jitter. For an input packet 202 the user can program a range of latencies 204 and a percentage of jitter 206. Signals 208 and 210 illustrates possible latencies for input packet 202, based on a single latency input and different jitter percentages.

Numerical examples are provided for better understanding. As described above, latency is a fixed delay between transmission of the input packet by a system, and the receipt of the packet by a receiving system. The fixed delay is generally in milliseconds. Random jitter is a random fluctuation subtracted from the maximum latency, and for the purposes described herein, is specified in percent of latency. Therefore, for a latency of 50 milliseconds and a jitter of 40 percent, the delay in the packet can range from 30 to 50 milliseconds. Stated mathematically, Total Random Delay=Latency−(Percent Jitter×Latency×Rand (1.0)).

In one specific embodiment, jitter alternates between a maximum value of jitter applied to the latency, and no applied jitter. For the above numerical example, jitter would causes delays that alternate between 30 milliseconds and 50 milliseconds.

The above described embodiments are utilized in the fault testing of ARINC 664 aircraft networks. However, the embodiments are applicable to testing of many types of networks, including almost any Ethernet network.

The described embodiments provide a method for adding latency and jitter to a number of selected packets transmitted between end systems within a network of end systems. Such a method includes entering a packet identifier, the packet identifier indicating a selected packet to which latency and jitter is to be added, entering a selected latency and jitter for the selected packet, receiving a packet, determining if the received packet is the selected packet, and forwarding it to its destination if the received packet is not the selected packet. If the received packet is the selected packet, the method includes reading a real time clock, computing a transmit time for the received packet based on the selected latency and jitter for the selected packet, and storing the received packet for later forwarding to its destination when the real time clock reaches the computed transmit time. In one embodiment, the method includes receiving a virtual LAN identifier, a destination port, a latency value and a jitter value via a user interface and determining if the received packet is the selected packet further includes determining whether a packet identifier within the received packet matches the virtual LAN identifier entered by a user into the graphical user interface. In the methods provided, receiving a packet may include continuously polling for incoming packets and computing a transmit time for the received packet may include storing the transmit time and packet in a buffer. Forwarding the received packet to its destination, in one embodiment, includes continuously checking if outgoing packets are to be transmitted, based on their computed transmit time and forwarding the packet to its destination when the computed transmit time matches or is less than the real time clock.

The tool 10 described above with respect to FIG. 1 may also be referred to as a network testing system that includes a computer having a user interface and a real time clock, that is operable to select a packet transmitted within a network to be tested for the addition of latency and jitter based on an identifier within the packet and select a latency and jitter to be applied to the selected packet. The network interface, for example network interface card 22, is communicatively coupled to the computer and includes a first interface configured for communicative coupling to a first network end system, and a second interface configured for communicative coupling to a second network end system. The network interface is operable to receive a packet at the first interface, determine if the received packet is the selected packet, and forward the received packet to its destination via the second interface if the received packet is not the selected packet. However, if the received packet is the selected packet, the network interface is further operable to read the real time clock, compute a transmit time for the received packet based on the selected latency and jitter, and store and forward the received packet to its destination via the second interface when the real time clock reaches the computed transmit time. As described elsewhere herein, the user interface is operable to enter a virtual LAN identifier, a destination port, a latency value and a jitter value, and further operable to determine whether a packet identifier within a packet received at the first interface matches the virtual LAN identifier entered via the user interface.

In various embodiments, the network interface is configured to continuously poll for incoming packets at the first interface and the second interface, and may include a buffer. In such an embodiment, the system is configured to compute a transmit time for the received packet and store the received packet and computed transmit time within the buffer, where the computed transmit time is based on the real time clock, the selected latency, and the selected jitter.

When forwarding the received packet to its destination, if the received packet is the selected packet, the network interface is configured to continuously check if outgoing packets are to be transmitted, based on their computed transmit time and a time associated with the real time clock. To forward the packet to its destination when the real time clock reaches the computed transmit time, the network interface is also configured to forward the packet to its destination when the computed transmit time matches or is less than the real time clock.

The subject matter of the present disclosure is described with specificity herein to meet statutory requirements. However, the description itself is not intended to limit the scope of this patent. Rather, it has been contemplated that the claimed subject matter might also be embodied in other ways, to include different steps or combinations of steps similar to the ones described in this document, in conjunction with other present or future technologies. Moreover, although the terms "step," "block," and/or "operation" may be used herein to connote different elements of methods employed, the terms should not be interpreted as implying any particular order among or between various steps herein disclosed unless and except when the order of individual steps is explicitly described.

This written description uses examples to disclose the described embodiments, including the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for adding latency and jitter to a number of selected packets transmitted between end systems within a network of end systems, said method comprising:

receiving a packet identifier, the packet identifier indicating a selected packet to which latency and jitter is to be added;

receiving a latency value and a jitter value for the selected packet, wherein the jitter value is specified as a percentage of the latency value;

receiving a packet;

determining if the received packet is the selected packet;

forwarding the received packet to its destination if the received packet is not the selected packet; and if the received packet is the selected packet, reading a real time clock;

computing a transmit time for the received packet at least in part by multiplying a random number, the latency value for the selected packet, and the jitter value for the selected packet; and storing the received packet for later forwarding to its destination when the real time clock reaches the computed transmit time.

2. The method of claim 1 wherein receiving a latency value and a jitter value for the selected packet comprises receiving a virtual LAN identifier, a destination port, a latency value and a jitter value via a user interface.

3. The method of claim 2 wherein determining if the received packet is the selected packet comprises determining whether a packet identifier within the received packet matches the virtual LAN identifier entered by a user into the graphical user interface.

4. The method of claim 1 wherein computing a transmit time for the received packet comprises storing the transmit time and received packet in a buffer.

5. The method of claim 4 wherein forwarding the received packet to its destination comprises continuously checking if outgoing packets are to be transmitted, based on their computed transmit time.

6. The method of claim 1 wherein forwarding the packet to its destination when the real time clock reaches the computed transmit time comprises forwarding the packet to its destination when the computed transmit time matches or is less than the real time clock.

7. A network testing system comprising:

a computer comprising a user interface and a real time clock, said computer and said user interface operable to select a packet transmitted within a network to be tested for the addition of latency and jitter based on an identifier within the packet and select a latency and jitter to be applied to the selected packet, the jitter specified as a percentage of the latency;

a network interface communicatively coupled to said computer, said network interface comprising:

a first interface configured for communicative coupling to a first network end system; and a second interface configured for communicative coupling to a second network end system, said network interface operable to receive a packet at said first interface, determine if the received packet is the selected packet, and forward the received packet to its destination via said second interface if the received packet is not the selected packet; and if the received packet is the selected packet, said network interface is further operable to read said real time clock, compute a transmit time for the received packet at least in part by multiplying a random number, the latency for the selected packet, and the jitter for the selected packet, and store the received packet for later forwarding to its destination via said second interface when said real time clock reaches the computed transmit time.

8. The system of claim 7 wherein said user interface is operable to enter a virtual LAN identifier, a destination port, a latency value and a jitter value.

9. The system of claim 8 wherein determining said network interface is operable to determine whether a packet identifier within a packet received at said first interface matches the virtual LAN identifier entered via said user interface.

10. The system of claim 7 wherein said network interface is configured to continuously poll for incoming packets at said first interface and said second interface.

11. The system of claim 7 wherein said network interface comprises a buffer, said system configured to compute a transmit time for the received packet and store the computed transmit time and received packet within said buffer, the computed transmit time based on said real time clock, the selected latency, and the selected jitter.

12. The system of claim 11 wherein to forward the received packet to its destination, if the received packet is the selected packet, said network interface is configured to continuously check if outgoing packets are to be transmitted, based on their computed transmit time and a time associated with said real time clock.

13. The system of claim 7 wherein to forward the packet to its destination when the real time clock reaches the computed transmit time, said network interface is configured to forward the packet to its destination when the computed transmit time matches the real time clock.

14. The system of claim 8 wherein said first interface and said second interface comprise ARINC 664 aircraft network interfaces.

15. A network interface comprising:

a first interface configured for communicative coupling to a first network end system; and a second interface configured for communicative coupling to a second network end system, said network interface operable to receive a packet at said first interface, determine if an identifier associated with the received packet matches a selected packet identifier, and forward the received packet to its destination via said second interface if the received packet identifier does not match the selected packet identifier; and if the received packet identifier does match the selected packet identifier, said network interface is operable to read a real time clock, compute a transmit time for the received packet at least in part by multiplying a random number, a latency for the selected packet, and a jitter for the selected packet, and store the received packet for later forwarding to its destination via said second interface when the real time clock reaches the computed transmit time.

16. The network interface of claim 15, said network interface configured to continuously poll for incoming packets at said first interface and said second interface.

17. The network interface of claim 15 further comprising a buffer, said network interface configured to compute a transmit time for the received packet and store the computed transmit time and received packet within said buffer when the received packet identifier matches the selected packet identifier, the computed transmit time based on a current value of the real time clock, the received latency, and the received jitter.

18. The network interface of claim 17, said network interface configured to forward the received packet to its destination via said second interface when the computed transmit time matches the real time clock.

19. The network interface of claim 16 wherein said first interface and said second interface comprise ARINC 664 aircraft network interfaces.

20. The method of claim 1 wherein computing a transmit time for the received packet further comprises:

multiplying the random number, the latency value for the selected packet, and the jitter value for the selected packet to create a random jitter value; and subtracting the random jitter value from the latency value.

* * * * *